US012658944B2

(12) United States Patent
Hwang et al.

(10) Patent No.: US 12,658,944 B2
(45) Date of Patent: Jun. 16, 2026

(54) ELECTRONIC DEVICE AND METHOD FOR CONTROLLING ANTENNA DEVICE USING CONFIGURATION PIN FOR IDENTIFYING COMMUNICATION MODULE

(71) Applicant: SAMSUNG ELECTRONICS CO., LTD., Suwon-si (KR)

(72) Inventors: Changho Hwang, Suwon-si (KR); Jisang Kim, Suwon-si (KR); Hanyeop Lee, Suwon-si (KR); Jinchul Choi, Suwon-si (KR); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 18/067,193

(22) Filed: Dec. 16, 2022

(65) Prior Publication Data

US 2023/0125972 A1     Apr. 27, 2023

Related U.S. Application Data

(63) Continuation of application No. PCT/KR2022/014072, filed on Sep. 21, 2022.

(30) Foreign Application Priority Data

| Oct. 27, 2021 | (KR) | ........................ 10-2021-0144596 |
| Dec. 8, 2021 | (KR) | ........................ 10-2021-0174836 |

(51) Int. Cl.
  *H04W 48/18*     (2009.01)
  *H04B 1/00*     (2006.01)
(52) U.S. Cl.
  CPC ................................... *H04B 1/006* (2013.01)

(58) Field of Classification Search
  CPC ........... H04B 1/006; H01Q 21/28; H01Q 1/22
  (Continued)

(56) References Cited

U.S. PATENT DOCUMENTS

| 8,725,999 B2 | 5/2014 | Cumming et al. |
| 10,701,703 B2 | 6/2020 | Kedem et al. |
| | (Continued) | |

FOREIGN PATENT DOCUMENTS

| JP | 11-510642 | 9/1999 |
| KR | 10-2010-0002588 A | 1/2010 |
| | (Continued) | |

OTHER PUBLICATIONS

PCT International Search Report dated Jan. 9, 2023 for PCT/KR2022/014072.

*Primary Examiner* — Tanmay K Shah
(74) *Attorney, Agent, or Firm* — Nixon & Vanderhye P.C.

(57) ABSTRACT

According to an example embodiment, an electronic device may include a communication module including a first configuration pin, a processor configured to identify a device type of the communication module through the first configuration pin, and a first antenna device controlled by the communication module through the first configuration pin, in which the communication module is configured to transmit an identification signal for identifying the device type of the communication module through the first configuration pin for a time interval from the start of booting the processor to the completion of initializing the communication module, and transmit a first control signal for controlling the first antenna device through the first configuration pin after the time interval.

20 Claims, 10 Drawing Sheets

(58) Field of Classification Search
    USPC ........................................................ 455/552.1
    See application file for complete search history.

(56)                       References Cited

U.S. PATENT DOCUMENTS

| | | | |
|---|---|---|---|
| 10,977,202 | B2 | 4/2021 | Seiler et al. |
| 2014/0004903 | A1 | 1/2014 | Tsai et al. |
| 2014/0354329 | A1 | 12/2014 | Wang et al. |
| 2016/0381687 | A1* | 12/2016 | Yang ........................ H03H 7/40 370/281 |
| 2019/0222280 | A1* | 7/2019 | Shu ...................... H04B 7/0874 |

FOREIGN PATENT DOCUMENTS

| | | |
|---|---|---|
| KR | 10-2017-0001094 A | 1/2017 |
| KR | 10-2019-0050818 A | 5/2019 |
| KR | 10-2019-0101895 A | 9/2019 |

* cited by examiner

| Pin No. | Signal | 0 | Pin No. |
|---|---|---|---|
| 74 | 3.3V | CONFIG_2 (States 4, 5, 6, 7 and 14) | 75 |
| 72 | 3.3V | GND | 73 |
| 70 | 3.3V | GND | 71 |
| 68 | SUSCLK(32kHz) (I) (0/3.3V) | CONFIG_1 (States 4, 5, 6, 7 AND 14) | 69 |
| 66 | SIM DETECT (I) | RESET# (I) (0/1.8V) | 67 |
| 64 | COEX_TXD (O) (0/1.8V) | ANTCTL3 (O) (0/1.8V) | 65 |
| 62 | COEX_RXD (I) (0/1.8V) | ANTCTL2 (O) (0/1.8V) | 63 |
| 60 | COEX3 (I) (0/1.8V) | ANTCTL1 (O) (0/1.8V) | 61 |
| 58 | N/C | ANTCTL0 (O) (0/1.8V) | 59 |
| 56 | N/C | GND | 57 |
| 54 | PEWAKE# (I/O) (0/3.3V) | REFCLKp | 55 |
| 52 | CLKREQ# (I/O) (0/3.3V) | REFCLKn | 53 |
| 50 | PERST# (I) (0/3.3V) | GND | 51 |
| 48 | VENDOR DEFINED or GPIO 4-TX_BLANKING/GNSS_1/UIM_PWR2/IPC_4 (I/O) (0/1.8V*) | PERp0 | 49 |
| 46 | VEBDOR DEFINED or GPIO 3-SYSCLK/GNSS_0/UIM_RST2/IPC_3 (I/O) (0/1.8V*) | PERn0 | 47 |
| 44 | VENDOR DEFINED or GPIO 2-GNSS_IRQ/GNSS_IRQ/UIM_CLK2/IPC_2 (I/O) (0/1.8V*) | GND | 45 |
| 42 | VENDOR DEFINED or GPIO_1-GNSS_SDA/UIM_SDA/UIM_DATA2/IPC_1 (I/O) (0/1.8V*) | PERp0 | 43 |
| 40 | VENDOR DEFINED or GPIO_0-GNSS_SCL/GNSS_SCL/UIM_DET2/IPC_0 (I/O) (0/1.8V*) | PERn0 | 41 |
| 38 | N/C | GND | 39 |
| 36 | UIM-PWR (O) | USC3.1-Rx+ | 37 |
| 34 | UIM-DATA (I/O) | USC3.1-Rx- | 35 |
| 32 | UIM-CLK (O) | GND | 33 |
| 30 | UIM-RESER (O) | USC3.1-Tx+ | 31 |
| 28 | VENDOR DEFINED or GPIO 8-AUDIO 3/RFU/IPC 6-AUDIO 3 (I/O) (0/1.8V) | USC3.1-Tx- | 29 |
| 26 | VENDOR DEFINED or GPIO 10-2_DISABLE2#/W_DISABLE2#/W_DISABLE2# (I/O) (0/1.8V) /HSIC_STROBE (I/O) (0/1.2V) | GND | 27 |
| 24 | VENDOR DEFINED or GPIO 7-AUDIO 2/AUDIO 2/RFU/IPC 5-AUDIO 2 (I/O) (0/1.8V) | DPR (I) (0/1.8V) | 25 |
| 22 | VENDOR DEFINED or GPIO 6-AUDIO_1/AUDIO_1/RFU/AUDIO_1 (I/O) (0/1.8V) | VENDOR DEFINED or GPIO 11-WoWWAN#/WoWWAN#/WoWWAN# (O) (0/1.8V) /HSIC_DATA (I/O) (0/1.2V) | 23 |
| 20 | VENDOR DEFINED or GPIO 5-AUDIO 0/AUDIO 0/RFU/AUDIO 0 (I/O) (0/1.8V) | CONFIG_0 (States 4, 5, 6, 7 and 14) | 21 |
|  | ADD-IN CARD KEY B | ADD-IN CARD KEY B |  |
|  | ADD-IN CARD KEY B | ADD-IN CARD KEY B |  |
|  | ADD-IN CARD KEY B | ADD-IN CARD KEY B |  |
|  | ADD-IN CARD KEY B | ADD-IN CARD KEY B |  |
| 10 | VENDOR DEFINED or GPIO 9-LED 1#/LED 1#/LED_1# (O) (OD) (0/3.3V) /IPC_7 (I/O) (0/1.8V) | GND | 11 |
| 8 | W_DISABLE1# (I) (0/3.3V) | USB D- | 9 |
| 6 | FULL_DARD_POWER_OFF# (I) (0/1.8V) | USB D- | 7 |
| 4 | 3.3V | GND | 5 |
| 2 | 3.3V | GND | 3 |
|  |  | CONFIG_3 (States 4, 5, 6, 7 and 14) | 1 |

FIG. 5

| State | Identification signal | | | | Device type and interface type | Port configuration |
|---|---|---|---|---|---|---|
| | CONFIG_0 (Pin 21) | CONFIG_1 (Pin 69) | CONFIG_2 (Pin 75) | CONFIG_3 (Pin 1) | | |
| 0 | GND | GND | GND | GND | SSD_SATA | N/A |
| 1 | GND | NC | GND | GND | SSD_PCIe | N/A |
| 2 | GND | GND | NC | GND | WWAN_PCIe | 0 |
| 3 | GND | NC | NC | GND | WWAN_PCIe | 1 |
| 4 | GND | GND | GND | NC | WWAN_USB3.1 Gen1 | 0 |
| 5 | GND | NC | GND | NC | WWAN_USB3.1 Gen1 | 1 |
| 6 | GND | GND | NC | NC | WWAN_USB3.1 Gen1 | 2 |
| 7 | GND | NC | NC | NC | WWAN_USB3.1 Gen1 | 3 |
| 8 | NC | GND | GND | GND | WWAN_SSIC | 0 |
| 9 | NC | NC | GND | GND | WWAN_SSIC | 1 |
| 10 | NC | GND | NC | GND | WWAN_SSIC | 2 |
| 11 | NC | NC | NC | GND | WWAN_SSIC | 3 |
| 12 | NC | GND | GND | NC | WWAN_PCIe | 2 |
| 13 | NC | NC | GND | NC | WWAN_PCIe | 3 |
| 14 | NC | GND | NC | NC | RFU | N/A |
| 15 | NC | NC | NC | NC | No Add-in Card Present | N/A |

FIG. 6

ELECTRONIC DEVICE AND METHOD FOR CONTROLLING ANTENNA DEVICE USING CONFIGURATION PIN FOR IDENTIFYING COMMUNICATION MODULE

CROSS-REFERENCE TO RELATED APPLICATIONS

This application is a continuation of International Application No. PCT/KR2022/014072 designating the United States, filed on Sep. 21, 2022, in the Korean Intellectual Property Receiving Office and claiming priority to Korean Patent Application No. 10-2021-0144596 filed on Oct. 27, 2021, and Korean Patent Application No. 10-2021-0174836 filed on Dec. 8, 2021, in the Korean Intellectual Property Office, the disclosures of which are all incorporated by reference herein in their entireties.

BACKGROUND

1. Field

The disclosure relates to a technology for controlling an antenna device using at least a configuration pin for identifying a communication module.

2. Description of Related Art

A communication module provided in an electronic device such as a laptop computer or a smartphone may have numerous components that are compactly arranged in a small space according to a light, thin, short, and small design trend.

For example, a communication module that supports high-frequency (e.g., millimeter waves, or mmWave) communication may include, per mmWave antenna device, two coaxial cable connectors configured to transmit vertical and horizontal intermediate frequency signals, one board-to-board (BtoB) connector including a pin for transmitting a control signal to an antenna, and an inter-frequency integrated circuit (IFIC) for conversion between an intermediate frequency and mmWave.

SUMMARY

An aspect of various example embodiments described herein provides an electronic device in which two or more antenna devices are provided to enhance a wireless communication performance or support a connection to various devices. The number of connectors that need to be included in a communication module may increase in proportion to the number of antenna devices provided in the electronic device. However, due to a limited arrangement space of the communication module, there may be a lack of space for arranging a connector for controlling two or more antenna devices.

An aspect of various example embodiments described herein provides an electronic device to secure a space in which connectors for controlling two or more antennas are to be arranged in a communication module.

However, technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an example embodiment, there is provided an electronic device which may include: a communication module including circuitry such as at least a first configuration pin; a processor configured to identify a device type of the communication module through the first configuration pin; and a first antenna device controlled by the communication module through the first configuration pin. The communication module may transmit an identification signal for identifying the device type of the communication module through the first configuration pin for a time interval from the start of booting the processor to the completion of initializing the communication module, and transmit a first control signal for controlling the first antenna device through the first configuration pin after the time interval.

According to an example embodiment, there is provided a method of controlling an antenna device of an electronic device using at least a configuration pin of a communication module, where the method may include: transmitting an identification signal for identifying a device type of the communication module to a processor included in the electronic device through a first configuration pin included in the communication module for a time interval from the start of booting the processor to the completion of initializing the communication module; and transmitting a first control signal for controlling a first antenna device to the first antenna device through the first configuration pin after the time interval.

According to an example embodiment, a communication module of an electronic device may control an antenna device of the electronic device using a configuration pin of the communication module that is used to identify the communication module when booting the electronic device, and may thus further include a connector for controlling an additional antenna device in a secured arrangement space of the communication module, without a separate board-to-board (BtoB) connector.

Other features and aspects will be apparent from the following detailed description, the drawings, and the claims.

BRIEF DESCRIPTION OF THE DRAWINGS

The above and other aspects, features, and advantages of certain example embodiments of the present disclosure will be more apparent from the following detailed description, taken in conjunction with the accompanying drawings, in which:

FIG. 5 is a diagram illustrating an example of pins and configuration pins included in a communication module according to an example embodiment;

FIG. 6 is a diagram illustrating an example operation of identifying a communication module by an electronic device through a configuration pin of the communication module according to an example embodiment;

DETAILED DESCRIPTION

Figure 1:
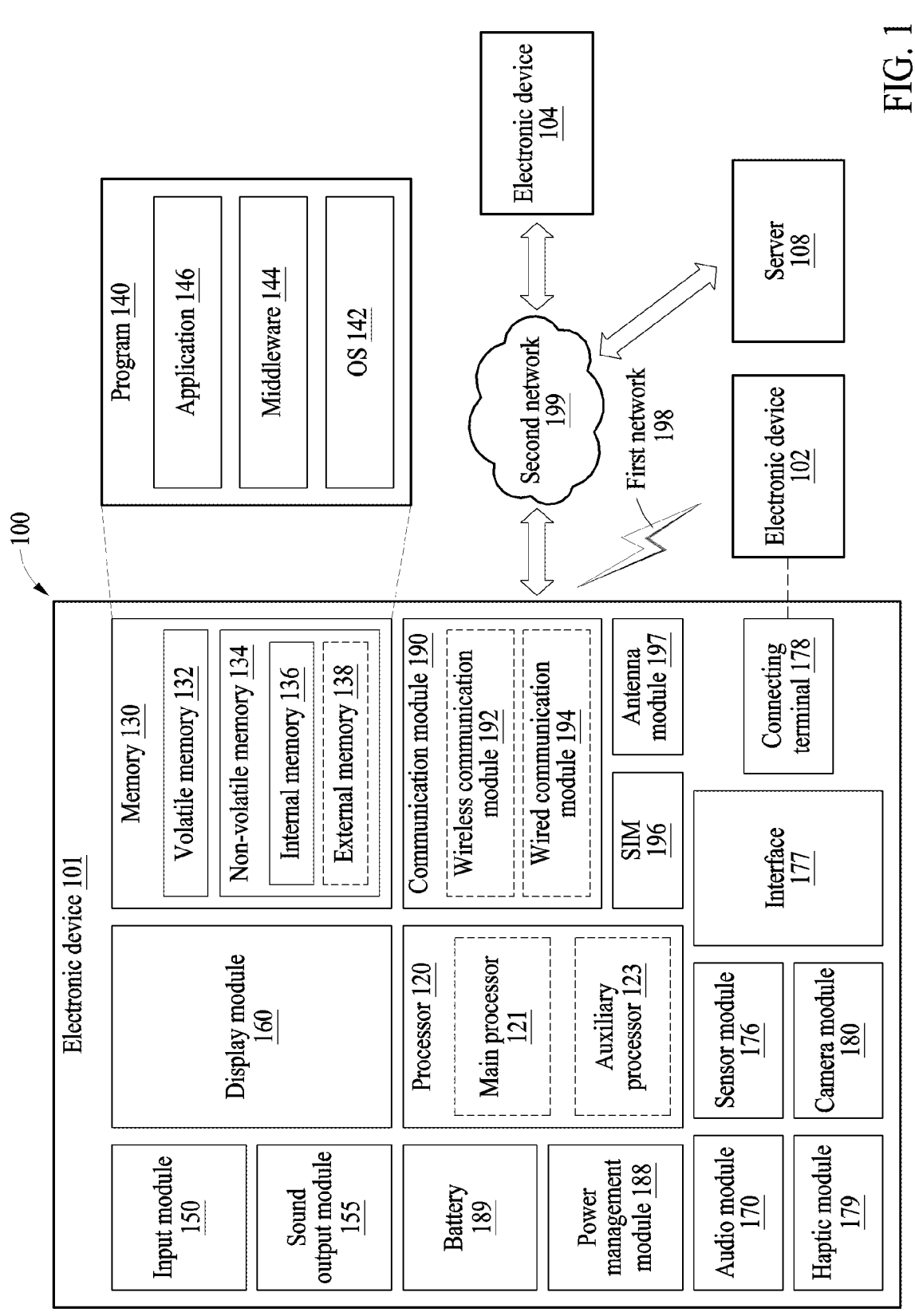
FIG. 1 is a block diagram illustrating an example electronic device in a network environment according to an example embodiment.

Hereinafter, various example embodiments will be described in greater detail with reference to the accompanying drawings. When describing the example embodiments with reference to the accompanying drawings, like reference numerals refer to like elements and a repeated description related thereto will be omitted. Each embodiment herein may be used in combination with any other embodiment(s) herein.

FIG. 1 is a block diagram illustrating an example electronic device in a network environment according to an example embodiment.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160). Each "module" herein may comprise circuitry.

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Each processor herein includes processing circuitry.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
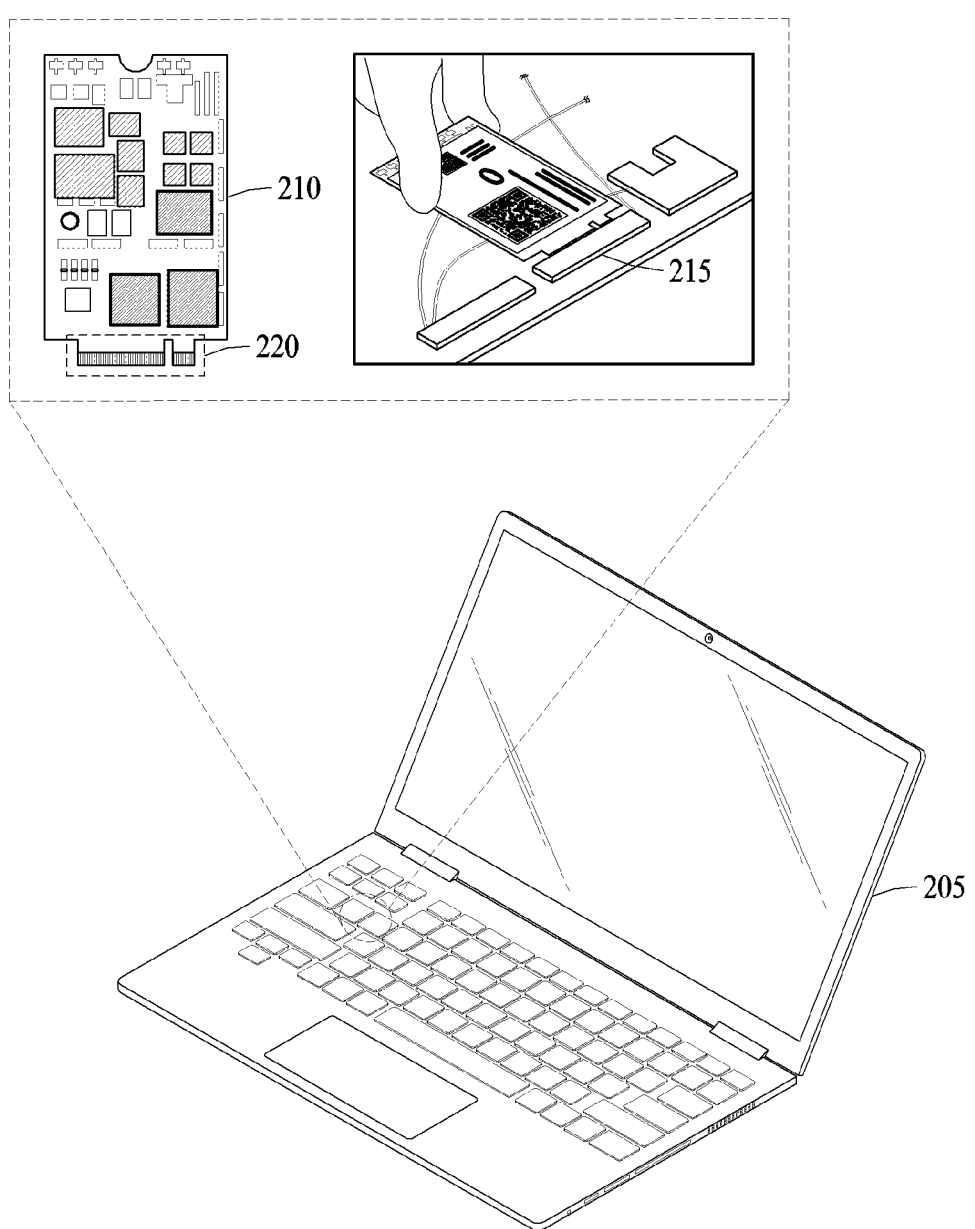
FIG. 2 is a diagram illustrating an example connection between an electronic device and a communication module according to an example embodiment.

FIG. 2 is a diagram illustrating an example connection between an electronic device and a communication module according to an example embodiment.

Referring to FIG. 2, an electronic device 205 (e.g., the electronic device 101 of FIG. 1) may include a communication module 210 (including communication circuitry such as, but not limited to, at least one pin) configured to process a radio frequency (RF) signal to perform wireless communication. The communication module 210 may process second generation (2G) to fifth generation (5G) data communication. In an example embodiment, the communication module 210 may be connected to the electronic device 205 through a connector 215 on a mainboard of the electronic device 205.

The communication module 210 provided in the electronic device 205 may have components that are compactly arranged in a small arrangement space according to a light, thin, short, and small design trend. For example, the communication module 210 supporting millimeter wave (mmWave) communication may include, per mmWave antenna device controlled by the communication module 210, two coaxial cable connectors for transmitting vertical and horizontal intermediate frequency signals, one board-to-board (BtoB) connector including a pin for transmitting a control signal to an antenna device, and an inter-frequency integrated circuit (IFIC) for conversion between an intermediate frequency and a mmWave.

In an example embodiment, the electronic device 205 may include two or more antenna devices to enhance a wireless communication performance or support connections to multiple devices. The number of connectors that needs to be included in the communication module 210 for the communication module 210 to control two or more antenna devices may increase in proportion to the number of antenna devices provided in the electronic device 205. However, due to a limited arrangement space of the communication module 210, there may be a lack of space in which the connectors for controlling the antenna devices are to be arranged.

In an example embodiment, the electronic device 205 may not include a BtoB connector by controlling an antenna device of the electronic device 205 through a configuration pin used for identifying a device type of the communication module 210 among pins 220 of the communication module 210 connected through the connector 215 of the mainboard, thereby securing the arrangement space.

In an example embodiment, the communication module 210 may transmit an identification signal for identifying a device type of the communication module 210 through the configuration pin. The identification signal may be used to identify the device type of the communication module 210 only when booting the electronic device 205, and may not be used after the booting is completed. After the device type of the communication module 210 is identified, the identification signal may no longer be needed, and thus the communication module 210 may use the configuration pin for another use. In an example embodiment, the communication module 210 may use the configuration pin to transmit a control signal for the antenna device, and may thus not separately include a BtoB connector for transmitting the control signal.

In an example embodiment, the communication module 210 may further include a connector for controlling an additional antenna device in the secured arrangement space of the communication module 210.

Hereinafter, a structure of the electronic device 205 and a structure of the communication module 210 will be described in detail with reference to FIGS. 3 and 4.

Figure 3:
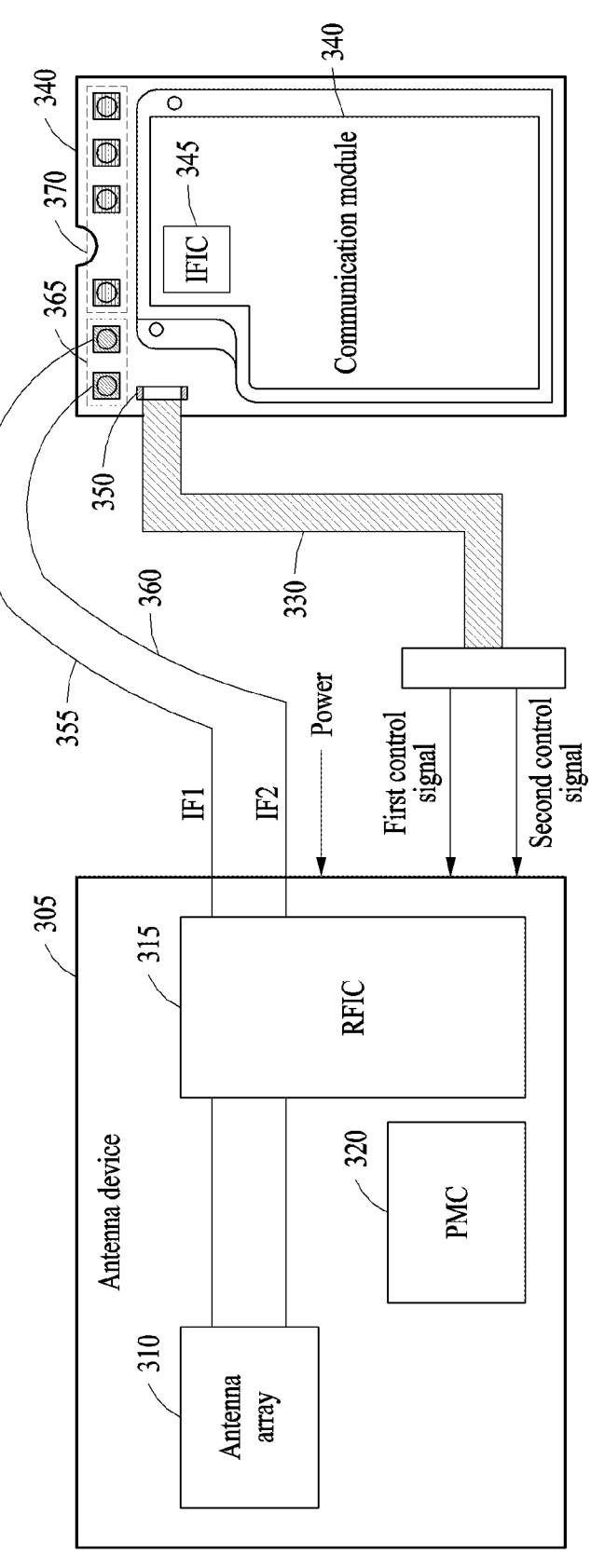
FIG. 3 is a diagram illustrating an example connection between a communication module and an antenna device according to a comparative example embodiment.

FIG. 3 is a diagram illustrating an example connection between a communication module and an antenna device according to a comparative example embodiment.

FIG. 3 illustrates a communication module 340 and an antenna device 305 according to a comparative example embodiment. In the comparative example embodiment, the communication module 340 configured to process an RF signal to perform wireless communication may include two coaxial cable connectors 365 to which coaxial cables for transmitting vertical and horizontal intermediate frequency signals are connected (e.g., see IF1 and IF2 in FIG. 3), a BtoB connector 350 including a pin for transmitting a control signal to the antenna device 305, and an IFIC 345 for frequency conversion of the RF signal. The communication module 340 may further include connectors 370 for long-term evolution (LTE) communication and sub-6 GHz fifth generation (5G) communication.

An intermediate frequency signal may be transmitted through coaxial cables 355 and 360 connected to the coaxial cable connectors 365 between the communication module 340 and the antenna device 305. For example, a horizontal intermediate frequency signal may be transmitted through the coaxial cable 355, and a vertical intermediate frequency signal may be transmitted through the coaxial cable 360. In an intermediate frequency band (e.g., 10 gigahertz (GHz) band) used for mmWave communication, a greater loss may occur as a length of a transmission path increases. To reduce such a loss, a coaxial cable may be used.

In the comparative example embodiment, the antenna device 305 may include an antenna array 310 for transmitting a mmWave signal, a radio frequency integrated circuit (RFIC) 315 for conversion between an intermediate frequency signal and a mmWave signal, and a power management circuit (PMC) 320 controlling power supplied to the antenna device 305.

In the comparative example embodiment, the communication module 340 may transmit a control signal to the antenna device 305 through a flexible printed circuit board (FPCB) 330 connected to the BtoB connector 350. For example, the communication module 340 may transmit a first control signal activating the antenna device 305 and a second control signal controlling the PMC 320 through the BtoB connector 350.

In the comparative example embodiment of FIG. 3, although the communication model 340 may need to further include a coaxial cable connector and a BtoB connector to control two or more antenna devices (e.g., the antenna device 305), there may be a lack of arrangement space in the communication module 340.

Hereinafter, a structure of an electronic device will be described in detail with reference to FIGS. 4 through 6.

Figure 4:
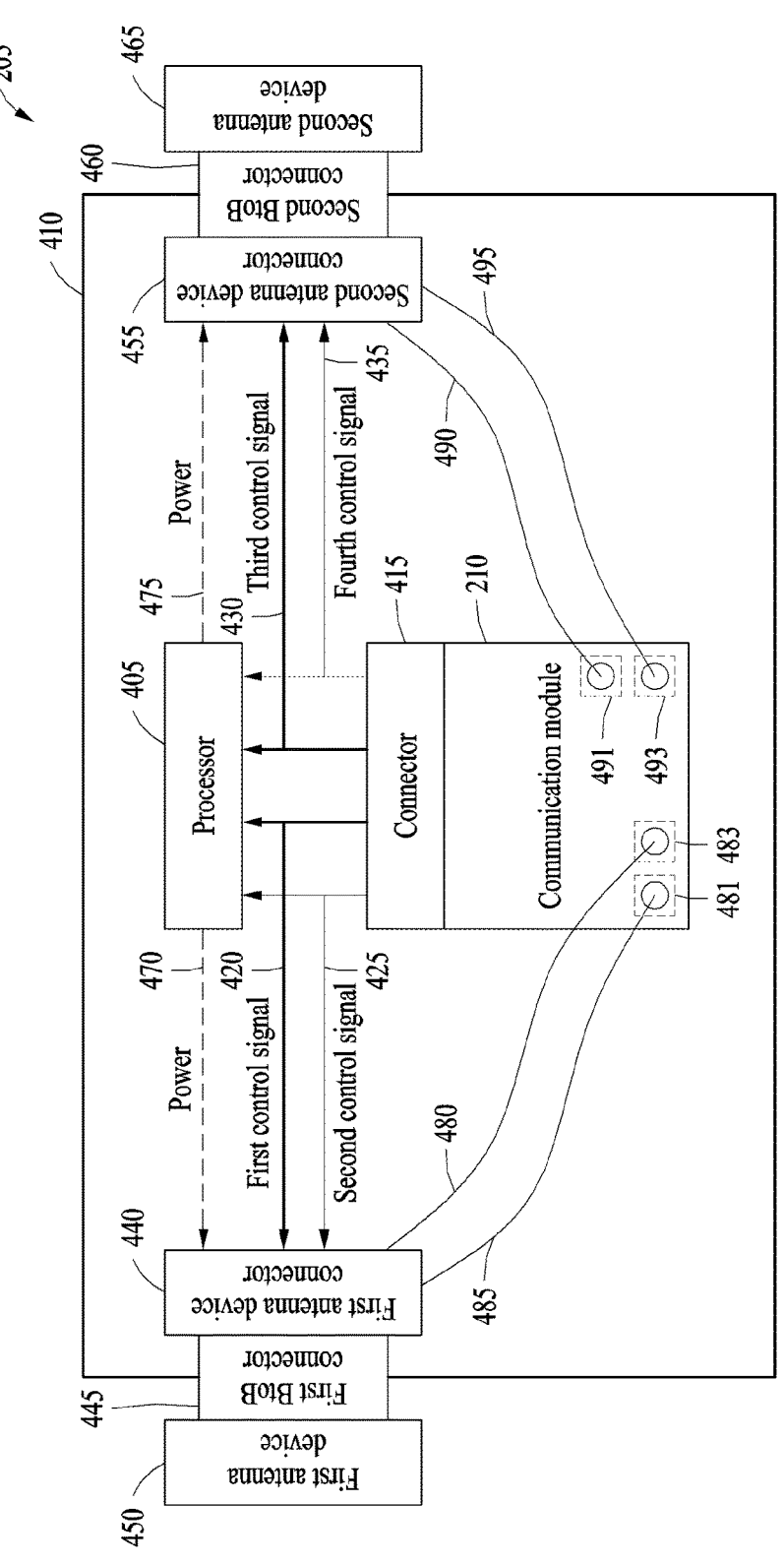
FIG. 4 is a diagram illustrating an example structure of an electronic device according to an example embodiment.

FIG. 4 is a diagram illustrating an example structure of an electronic device according to an example embodiment. FIG. 5 is a diagram illustrating an example of pins and configuration pins included in a communication module according to an example embodiment. FIG. 6 is a diagram illustrating an example operation of identifying a device type of a communication module by an electronic device through a configuration pin of the communication module according to an example embodiment.

Referring to FIG. 4, an electronic device (e.g., the electronic device 205) may include a processor 405, a communication module 210, a first antenna device 450 (e.g., the antenna device 305 of FIG. 3), and a second antenna device 465 (e.g., the antenna device 305 of FIG. 3). The processor 405 may be disposed on a mainboard 410 of the electronic device 205. According to an example embodiment, the processor 405 (e.g., the processor 120 of FIG. 1, the processor 121 of FIG. 1, and/or the auxiliary processor 123 of FIG. 1) may include a power management module (e.g., the power management module 188 of FIG. 1).

The communication module 210, including communication circuitry, may be connected to the mainboard 410 through a connector 415. The communication module 210 may be connected to the processor 405, the first antenna device 450, and the second antenna device 465 through wirings 420, 425, 430, and 435 of the mainboard 410. The first antenna device 450 and the second antenna device 465 may be connected to the mainboard 410 of the electronic device 205 through a first antenna device connector 440 and a second antenna device connector 455 of the mainboard 410. The first antenna device 450 and the second antenna device 465 may be connected to the processor 405 and the communication module 210 through wirings 420, 425, 430, 435, 470, and 475 of the mainboard 410.

In an example embodiment, the communication module 210 may be connected to the mainboard 410, as pins (e.g., the pins 220 of FIG. 2) of the communication module 210 access the connector 415. The communication module 210 may include a configuration pin for identifying a device type of the communication module 210. For example, FIG. 5 illustrates pins (pin numbers (nos.) 1 through 75) included in the communication module 210 of M.2 standard specifications and signals transmitted through the pins. In the example of FIG. 5, the communication module 210 of the M.2 standard specifications may include a first configuration pin (pin no. 21), a second configuration pin (pin no. 69), a third configuration pin (pin no. 75), and a fourth configuration pin (pin no. 1) that transmit an identification signal for identifying a device type of the communication module 210. The identification signal may indicate a bit signal transmitted through each configuration pin.

The connector 415 may be a connector of M.2 specifications. For example, the connector 415 may be a connector of the M.2 specifications, and may be soldered to the mainboard 410 to be disposed thereon.

In an example embodiment, the processor 405 may identify a device type of the communication module 210 based on the identification signal input through a configuration pin of the communication module 210. For example, as illustrated in FIG. 5, the processor 405 may identify a type of a device provided in the connector 415 based on a combination of signals of respective configuration pins that are input to the processor 405 through the configuration pins (e.g., pin nos. 1, 21, 69, and 75). A device type corresponding to a signal of a configuration pin may be determined.

For example, FIG. 6 illustrates device types, interface types, and port configuration types that are identified according to a combination of signals of configuration pins (pin nos. 1, 21, 69, and 75). The processor 405 may identify a type of a device provided in the connector 415 as the communication module 210 (e.g., a wireless wide area network (WWAN)) through an identification signal transmitted from a configuration pin of the communication module 210. In addition to the device type of the communication module 210, the processor 405 may identify a type of an interface through which the communication module 210 is connected to the connector 415.

For example, as illustrated, when an NC signal indicating not connected (NC) is transmitted through the first configuration pin (pin no. 21), the second configuration pin (pin no.

69), and the fourth configuration pin (pin no. 1), and a GND signal indicating ground (GND) is transmitted through the third configuration pin (pin no. 75), the processor 405 may identify that a device connected to the connector 415 is the communication module 210 (e.g., WWAN) and the device is connected through an interface of a peripheral component interconnect express (PCIe) type.

The processor 405 may further identify a port configuration type based on a combination of signals of configuration pins (e.g., pin nos. 1, 21, 69, and 75). A port configuration type corresponding to a signal of a configuration pin may be determined in advance. Based on the identified port configuration type, the processor 405 may determine a signal transmitted through pins of the communication module 210 and process the signal accordingly.

However, the M.2 specifications illustrated in FIGS. 5 and 6 are provided merely as an example, and the specifications of the communication module 210 and the connector 415 may be determined in various ways as needed.

In an example embodiment, the identification signal for identifying the device type of the communication module 210 may only be used when booting the electronic device 205, and may not be used when the booting is completed. The electronic device 205 may identify the device type of the communication module 210 through the identification signal in a process of booting the processor 405, and a signal input from a configuration pin of the communication module 210 to the processor 405 after the booting of the processor 405 may be ignored by the processor 405.

After the device type of the communication module 210 is identified by the processor 405 (including processing circuitry), the identification signal may no longer be needed. Thus, a signal transmitted from the communication module 210 through a configuration pin may not affect an operation of the processor 405, and thus the communication module 210 may use the configuration pin for another use.

After the identification of the device type of the communication module 210, the configuration pin of the communication module 210 may be used to transmit a control signal for an antenna device. The control signal may be at least one of a control signal (e.g., the first control signal of FIG. 3) that activates the antenna device or a control signal (e.g., the second control signal of FIG. 3) that controls a PMC of the antenna device.

For example, the communication module 210 may transmit an identification signal for identifying a device type of the communication module 210 through a first configuration pin for a time interval from the start of booting the processor 405 to the completion of initializing the communication module 210, and then transmit a control signal for controlling the first antenna device 450 through the first configuration pin after the time interval. The control signal transmitted through the first configuration pin may be, for example, a first control signal activating an antenna device as described with reference to FIG. 4.

The communication module 210 may transmit an identification signal for identifying a device type of the communication module 210 through a second configuration pin for the time interval from the start of booting the processor 405 to the completion of initializing the communication module 210, and then transmit a control signal for controlling the first antenna device 450 through the second configuration pin after the time interval. The control signal transmitted through the second configuration pin may be, for example, a second control signal controlling a PMC of an antenna device as described with reference to FIG. 4.

The communication module 210 may transmit an identification signal for identifying a device type of the communication module 210 through a third configuration pin for the time interval from the start of booting the processor 405 to the completion of initializing the communication module 210, and then transmit a control signal for controlling the second antenna device 465 through the third configuration pin after the time interval. The control signal transmitted through the third configuration pin may be, for example, a third control signal activating an antenna device as described with reference to FIG. 4.

The communication module 210, including communication circuitry, may transmit an identification signal for identifying a device type of the communication module 210 through a fourth configuration pin for the time interval from the start of booting the processor 405 to the completion of initializing the communication module 210, and then transmit a control signal for controlling the second antenna device 465 through the fourth configuration pin after the time interval. The control signal transmitted through the fourth configuration pin may be, for example, a fourth control signal controlling a PMC of an antenna device as described with reference to FIG. 4.

In an example embodiment, the processor 405, the first configuration pin, and the first antenna device 450 may be connected through the wiring 420 of the mainboard 410. The identification signal and the first control signal that are transmitted from the first configuration pin may be transmitted through the wiring 420.

The processor 405, the second configuration pin, and the first antenna device 450 may be connected through the wiring 425 of the mainboard 410. The identification signal and the second control signal that are transmitted from the second configuration pin may be transmitted through the wiring 425.

The processor 405, the third configuration pin, and the second antenna device 465 may be connected through the wiring 430 of the mainboard 410. The identification signal and the third control signal that are transmitted from the third configuration pin may be transmitted through the wiring 430.

The processor 405, the fourth configuration pin, and the second antenna device 465 may be connected through the wiring 435 of the mainboard 410. The identification signal and the fourth control signal that are transmitted from the fourth configuration pin may be transmitted through the wiring 435.

In an example embodiment, the processor 405 may ignore a signal input through the first through fourth configuration pins after the time interval from the start of booting the processor 405 to the completion of initializing the communication module 210.

In an example embodiment, the processor 405 may transmit power to the first antenna device 450 through the wiring 470 of the mainboard 410 and transmit power to the second antenna device 465 through the wiring 475 of the mainboard 410.

In an example embodiment, the communication module 210 may transmit a vertical intermediate frequency (IF) signal to the first antenna device 450 (which includes at least one antenna) through a first coaxial cable 485 connected to a first coaxial cable connector 481, and transmit a horizontal intermediate frequency signal to the first antenna device 450 through a second coaxial cable 480 connected to a second coaxial cable connector 483.

In an example embodiment, the communication module 210 may use the configuration pins of the communication module 210 to transmit control signals for the first antenna device 450 and the second antenna device 465, and may thus secure an arrangement space without separately including a BtoB connector (e.g., the BtoB connector 350 of FIG. 2) for transmitting a control signal.

The communication module 210 may include, in the secured arrangement space, a third coaxial cable connector 491 and a fourth coaxial cable connector 493 for transmitting intermediate frequency signals to the second antenna device 465. The communication module 210 may transmit a vertical intermediate frequency signal to the second antenna device 465 through a third coaxial cable 490 connected to the third coaxial cable connector 491 and transmit a horizontal intermediate frequency signal to the second antenna device 465 through a fourth coaxial cable 495 connected to the fourth coaxial cable connector 493.

In an example embodiment, the electronic device 205 may transmit control signals for the first antenna device 450 and the second antenna device 465 using the configuration pins of the communication module 210 and the wirings 420, 425, 430, and 435 of the mainboard 410, and transmit intermediate frequency signals to the first antenna device 450 and the second antenna device 465 using coaxial cables, thereby controlling a plurality of antenna devices in a limited arrangement space of the communication module 210 and reducing a path loss of an RF signal in the electronic device 205.

Signals input to the first antenna device 450 and the second antenna device 465 may be transmitted to the first antenna device 450 and the second antenna device 465 through the first antenna device connector 440 and the second antenna device connector 455, respectively. The first antenna device connector 440 and the second antenna device connector 455 may be disposed on the mainboard 410. The first antenna device connector 440 may be connected to the wirings 420, 425, and 470 and the coaxial cables 480 and 485. The second antenna device connector 455 may be connected to the wirings 430, 435, and 475 and the coaxial cables 490 and 495.

The first antenna device 450 and the second antenna device 465 may be connected to the first antenna device connector 440 and the second antenna device connector 455 through a first BtoB connector 445 and a second BtoB connector 460, respectively.

According to an example embodiment, the electronic device 205 may not use expensive components such as a BtoB connector between the communication module 210 and an antenna device, for example, the first antenna device 450 and the second antenna device 465, thereby improving the economic efficiency of the electronic device 205.

In addition, the electronic device 205 may not include a component such as the FPCB 330 of FIG. 3, and a degree of freedom (DoF) for designing the electronic device 205 may thereby be increased.

Hereinafter, a signal transmitted through a configuration pin will be described in detail with reference to FIG. 7.

Figure 7:
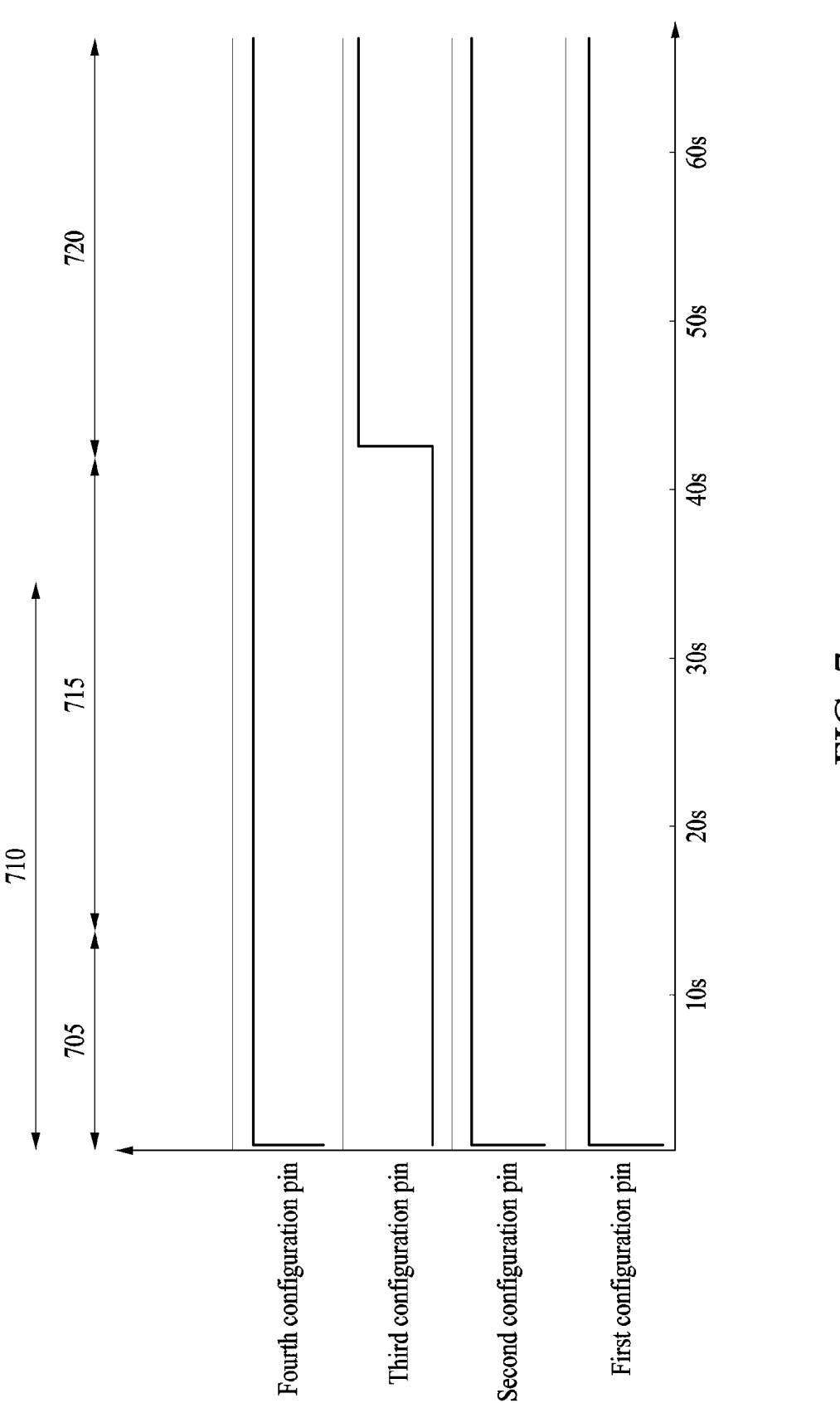
FIG. 7 is a diagram illustrating an example signal transmitted by a communication module through a configuration pin according to an example embodiment.

FIG. 7 is a diagram illustrating an example signal transmitted by a communication module through a configuration pin according to an example embodiment.

FIG. 7 illustrates signals transmitted based on a time through first through fourth configuration pins of a communication module.

For a time interval 705, power may be supplied to the electronic device 205, and the processor 405 may be booted. For example, when a time of 10 to 15 seconds elapses, the booting of the processor 405 may be completed.

For a time interval 710, power may be supplied to the communication module 210, and the communication module 210 may be booted. For example, when a time of 30 to 35 seconds elapses after the booting is started, the booting may be completed.

For the time interval 710, the communication module 210 may transmit, to the processor 405, an identification signal for identifying a device type of the communication module 210 through the first through fourth configuration pins.

For a time interval 715 after the time interval 705 at which the booting is completed, the processor 405 may install a driver for operating devices provided in the electronic device 205 and operate the driver. Before a time at which the time interval 710 is ended, the processor 405 may complete identifying the device type of the communication module 210.

After the device type of the communication module 210 is identified by the processor 405, the communication module 210 may transmit a control signal for controlling an antenna device (e.g., the first antenna device 450 and the second antenna device 465 of FIG. 4) using the first through fourth configuration pins.

For a time interval 720, as the identification of the device type of the communication module 210 is completed by the processor 405, the communication module 210 may transmit a first control signal activating the first antenna device 450 through the first configuration pin, transmit a second control signal controlling a PMC of the first antenna device 450 through the second configuration pin, transmit a third control signal activating the second antenna device 465 through the third configuration pin, and transmit a fourth control signal controlling a PMC of the second antenna device 465 through the fourth configuration pin.

Figure 8:
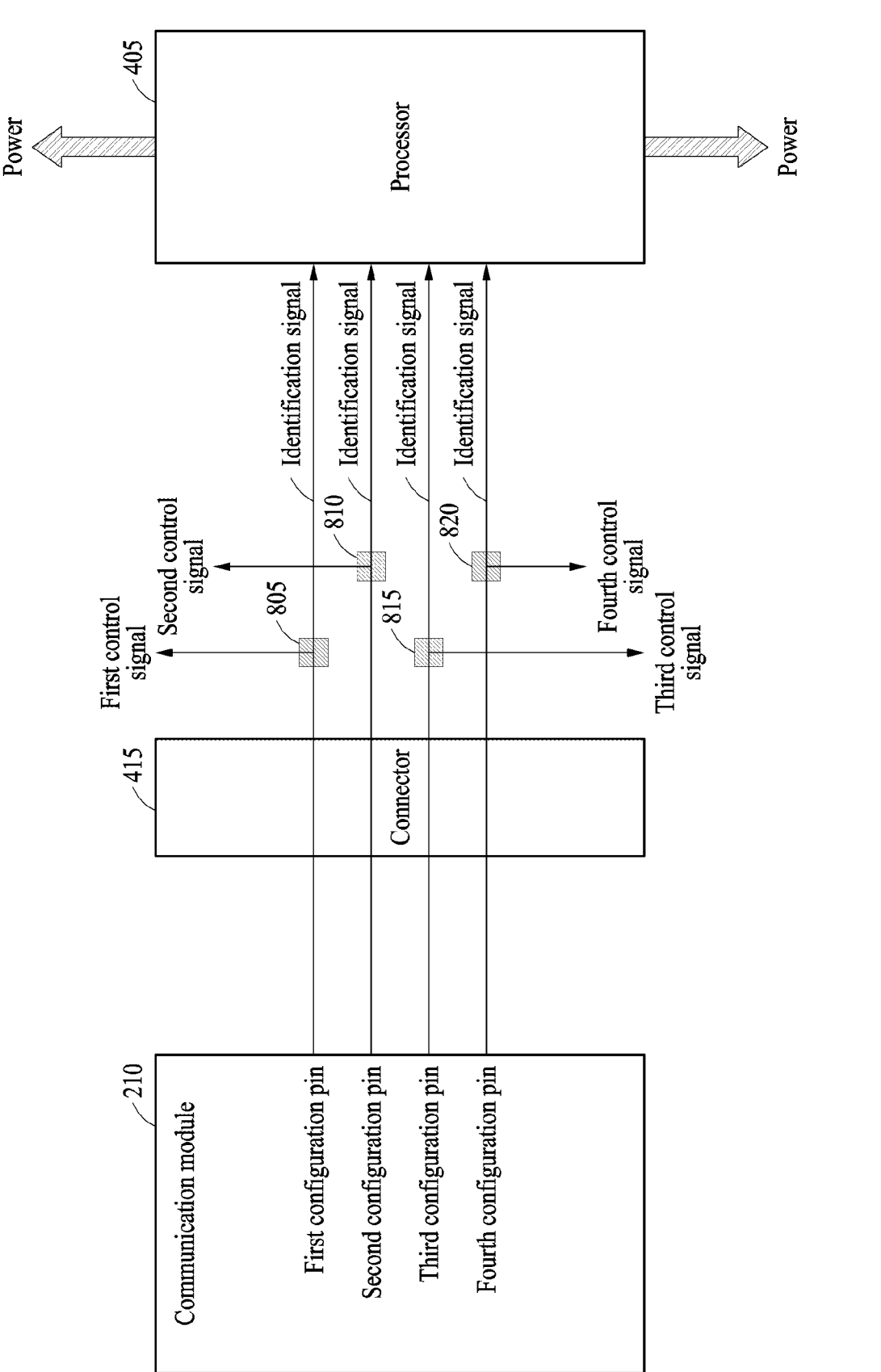
FIG. 8 is a diagram illustrating an example switch controlling a connection among an electronic device, a communication module, and an antenna device according to an example embodiment.

FIG. 8 is a diagram illustrating an example switch controlling a connection among an electronic device, a communication module, and an antenna device according to an example embodiment.

FIG. 8 illustrates the communication module 210, the connector 415, the processor 405, and a plurality of switches 805, 810, 815, and 820.

In an example embodiment, the switch 805 may control a connection among the processor 405, the first antenna device 450, and a first configuration pin. The switch 810 may control a connection among the processor 405, the first antenna device 450, and a second configuration pin. The switch 815 may control a connection among the processor 405, the second antenna device 465, and a third configuration pin. The switch 820 may control a connection among the processor 405, the second antenna device 465, and a fourth configuration pin.

In an example embodiment, the switches 805, 810, 815, and 820 may be controlled such that the communication module 210 and the processor 405 are connected for a time interval from the start of booting the processor 405 to the completion of initializing the communication module 210, and be controlled such that the communication module 210 and the first antenna device 450 or the second antenna device 465 are connected after the time interval.

For example, the switch 810 may be controlled to connect the communication module 210 and the processor 405 for the time interval, and be controlled to connect the communication module 210 and the first antenna device 450 after the time interval. The switch 815 may be controlled to connect the communication module 210 and the processor 405 for the time interval, and be controlled to connect the communication module 210 and the second antenna device 465 after the time interval.

In an example embodiment, the switches 805, 810, 815, and 820 may be single pole double throw (SPDT) switches. The switches 805, 810, 815, and 820 may be disposed on a mainboard of the electronic device 205.

In an example embodiment, as the electronic device 205 includes the switches 805, 810, 815, and 820, the purposes of use of configuration pins based on a time may be explicitly divided.

Figure 9:
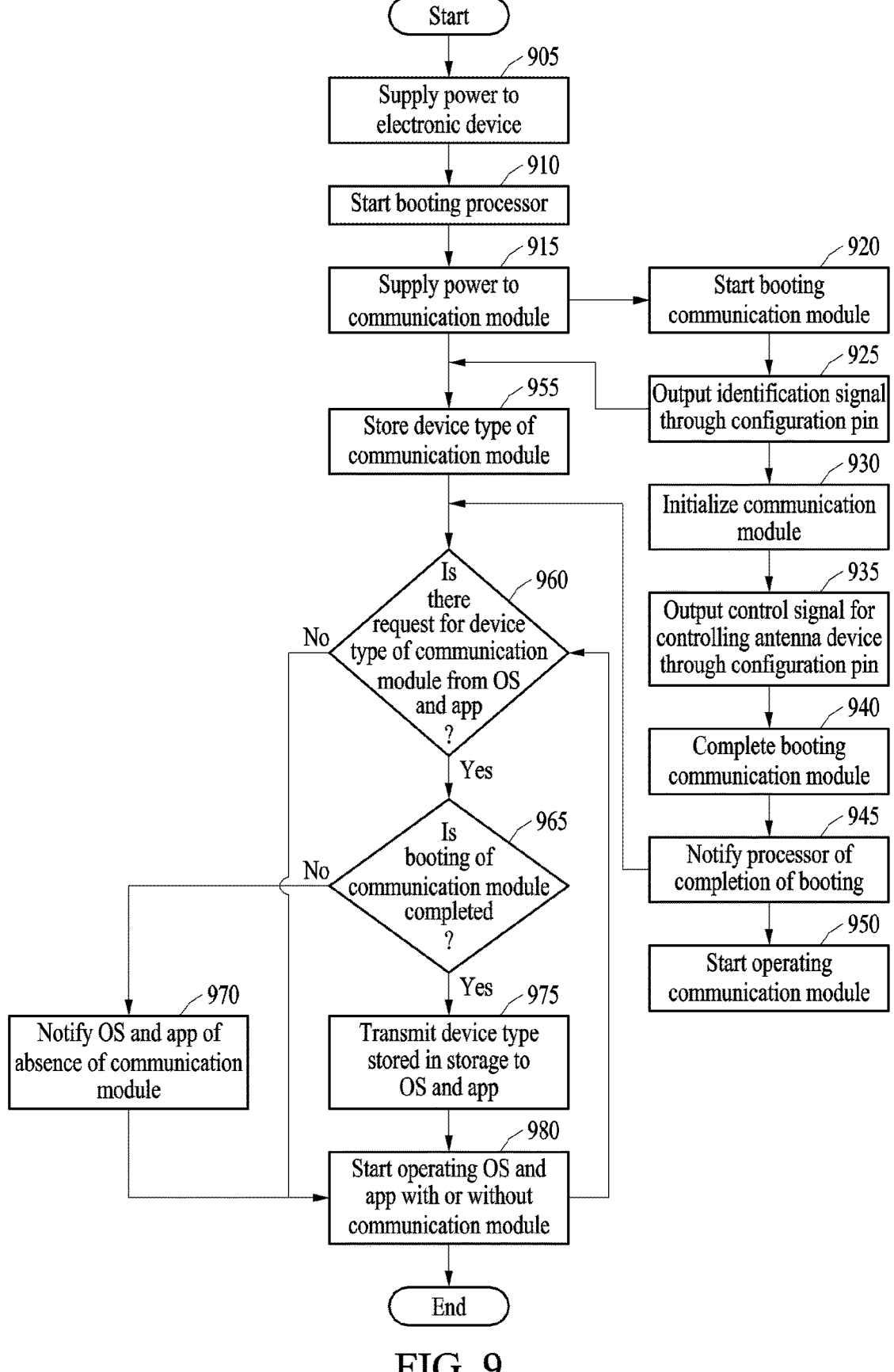
FIG. 9 is a flowchart illustrating an example method performed by a processor and a communication module in an electronic device according to an example embodiment.

FIG. 9 is a flowchart illustrating an example method performed by a processor and a communication module in an electronic device according to an example embodiment.

Referring to FIG. 9, in operation 905, power may be supplied to the electronic device 205. When power is supplied to the electronic device 205 in operation 905, booting of the processor 405 of the electronic device 205 may be started in operation 910, power may be supplied to the communication module 210 in operation 915, and booting of the communication module 210 may be started in operation 920.

In operation 925, when the booting of the communication module 210 is started, the communication module 210 may output an identification signal through a configuration pin (e.g., the first configuration pin (pin no. 21), the second configuration pin (pin no. 69), the third configuration pin (pin no. 75), and the fourth configuration pin (pin no. 1) of FIG. 5) of the communication module 210 to allow the processor 405 to identify a device type of the communication module 210.

In operation 930, the communication module 210 may initialize the communication module 210 before performing wireless communication. In operation 935, when the initialization of the communication module 210 is completed, the communication module 210 may output a control signal for controlling an antenna device (e.g., the first antenna device 450 and the second antenna device 465 of FIG. 4) through the configuration pin.

In operation 940, the booting of the communication module 210 may be completed. In operation 945, when the booting of the communication module 210 is completed, the communication module 210 may transmit a notification indicating the completion of the booting to the processor 405.

In operation 950, when the booting is completed, the communication module 210 may start operating.

In operation 955, the processor 405 may identify a device type of the communication module 210 based on an identification signal input from the configuration pin of the communication module 210 and store the identified device type.

In operation 960, the processor 405 may determine whether there is a request for the device type of the communication module 210 from an operating system (OS) and an application (app) that are operated by the processor 405.

In operation 965, when there is the request for the device type of the communication module 210 from the OS and the app in step 960 (yes in 960), the processor 405 may determine whether the booting of the communication module 210 is completed. If booting is complete in 965, then in operation 975, when receiving the notification from the communication module 210 in operation 945, the processor 405 may transmit the device type of the communication module 210 to the OS and the app.

In operation 980, when transmitting the device type of the communication module 210 to the OS and the app in operation 975, the processor 405 may operate the OS and the app along with the communication module 210.

When there is no request for the device type of the communication module 210 from the OS and the app in operation 960 ("no" in 960), the processor 405 may operate the OS and the app without the communication module 210 in operation 980.

In operation 970, when it is determined that the booting of the communication module 210 is not completed in operation 965, the processor 405 may transmit a notification indicating the absence of the communication module 210 to the OS and the app. When transmitting the notification indicating the absence of the communication module 210 to the OS and the app in operation 970, the processor 405 may operate the OS and the app without the communication module 210 in operation 980.

In an example embodiment, the processor 405 may perform again operation 960 during an operation of the OS and the app, and determine whether there is a request for the device type of the communication module 210 from the OS and the app.

Figure 10:
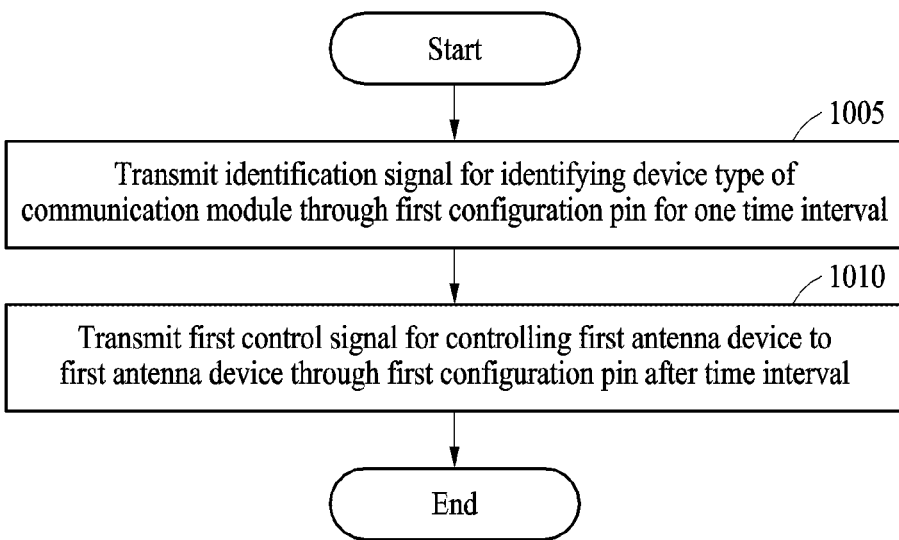
FIG. 10 is a flowchart illustrating an example method of controlling an antenna device using a configuration pin of a communication module according to an example embodiment.

FIG. 10 is a flowchart illustrating an example method of controlling an antenna device using a configuration pin of a communication module according to an example embodiment.

Referring to FIG. 10, in operation 1005, the electronic device 205 may transmit an identification signal for identifying a device type of the communication module 210 through a first configuration pin of the communication module 210 for one time interval. For example, the electronic device 205 may transmit the identification signal for identifying the device type of the communication module 210 to the processor 405 included in the electronic device 205 through the first configuration pin included in the communication module 210 for the time interval from a time at which booting of the processor 405 is started to a time at which initialization of the communication module 210 is completed.

In operation 1010, the electronic device 205 may transmit a first control signal for controlling the first antenna device 450 of the electronic device 205 to the first antenna device 450 through the first configuration pin of the communication module 210 after the time interval of operation 1005. The first control signal may be a control signal activating the first antenna device 450.

In an example embodiment, the electronic device 205 may transmit a second control signal for controlling a PMC of the first antenna device 450 through a second configuration pin of the communication module 210. The electronic device 205 may transmit an identification signal for identifying the device type of the communication module 210 through the second configuration pin of the communication module 210 for the time interval of operation 1005, and transmit the second control signal for controlling the PMC of the first antenna device 450 to the first antenna device 450 through the second configuration pin after the time interval.

In an example embodiment, the electronic device 205 may transmit an identification signal for identifying the device type of the communication module 210 to the processor 405 through a third configuration pin of the communication module 210 for the time interval of operation 1005. The electronic device 205 may transmit the third control signal activating the second antenna device 465 of the electronic device 205 to the second antenna device 465 through the third configuration pin after the time interval.

In an example embodiment, the electronic device 205 may transmit an identification signal for identifying the device type of the communication module 210 to the processor 405 through a fourth configuration pin of the communication module 210 for the time interval of operation 1005. The electronic device 205 may transmit the fourth control signal for controlling a PMC of the second antenna device 465 to the second antenna device 465 through the fourth configuration pin after the time interval.

In an example embodiment, the electronic device 205 may transmit an intermediate frequency signal through a coaxial cable connecting the communication module 210 and the first antenna device 450. The electronic device 205 may transmit an intermediate frequency signal through a coaxial cable connecting the communication module 210 and the second antenna device 465.

In an example embodiment, the electronic device 205 may control a switch (e.g., 805 or 810) of the electronic device 205 such that the processor 405 and the communication module 210 are connected for the time interval of operation 1005, and control a switch (e.g., 805 or 810) such that the communication module 210 and the first antenna device 450 are connected after the time interval.

In an example embodiment, the electronic device 205 may control a switch (e.g., 815 or 820) of the electronic device 205 such that the processor 405 and the communication module 210 are connected for the time interval of operation 1005, and control a switch (e.g., 815 or 820) such that the communication module 210 and the first antenna device 450 are connected after the time interval.

According to an example embodiment, an electronic device (e.g., 205) may include a communication module (e.g., 210) including a first configuration pin, a processor (e.g., 405) configured to identify a device type of the communication module 210 through the first configuration pin, and a first antenna device (e.g., 450) controlled by the communication module 210 through the first configuration pion. The communication module 210 may transmit an identification signal for identifying the device type of the communication module 210 for a time interval from the start of booting the processor 405 to the completion of initializing the communication module 210, and transmit a first control signal for controlling the first antenna device 450 through the first configuration pin after the time interval.

The electronic device 205 may further include a switch (e.g., 805) for controlling a connection among the processor 405, the first antenna device 450, and the first configuration pin.

The switch 805 may be controlled to connect the processor 405 and the first configuration pin for the time interval and may be controlled to connect the first antenna device 450 and the first configuration pin after the time interval.

The switch 805 may be controlled by the processor 405.

The electronic device 205 may further include a mainboard (e.g., 410) on which the communication module 210, the processor 405, and the first antenna device 450 are provided, and the processor 405, the first configuration pin, and the first antenna device 450 may be connected through a wiring (e.g., 420) of the mainboard 410.

The processor 405 may ignore a signal input from the first configuration pin after the time interval.

The first control signal may indicate a control signal that activates the first antenna device 450. The communication module 210 may further include a second configuration pin, and transmit a second control signal for controlling a PMC of the first antenna device 450 through the second configuration pin.

The communication module 210 may transmit an identification signal for identifying the device type of the communication module 210 through the second configuration pin for the time interval, and transmit the second control signal through the second configuration pin after the time interval.

The electronic device 205 may further include a second antenna device (e.g., 465), and the communication module 210 may further include a third configuration pin and a fourth configuration pin. The communication module 210 may transmit a third control signal activating the second antenna device 465 through the third configuration pin, and transmit a fourth control signal controlling a PMC of the second antenna device 465 through the fourth configuration pin.

The communication module 210 may transmit an identification signal for identifying the device type of the communication module 210 through the third configuration pin for the time interval, and transmit the third control signal through the third configuration pin after the time interval.

The communication module 210 may transmit an identification signal for identifying the device type of the communication module 210 through the fourth configuration pin for the time interval, and transmit the fourth control signal through the fourth configuration pin after the time interval.

The communication module 210 may further include a first coaxial cable connector (e.g., 481) for connecting a first coaxial cable (e.g., 485) transmitting a vertical intermediate frequency signal between the first antenna device 450 and the communication module 210, and a second coaxial cable connector (e.g., 483) for connecting a second coaxial cable (e.g., 480) transmitting a horizontal intermediate frequency signal between the first antenna device 450 and the communication module 210.

The communication module 210 may further include a third coaxial cable connector (e.g., 491) for connecting a third coaxial cable (e.g., 490) transmitting a vertical intermediate frequency signal between the second antenna device 465 and the communication module 210, and a fourth coaxial cable connector (e.g., 493) for connecting a fourth coaxial cable (e.g., 495) transmitting a horizontal intermediate frequency signal between the second antenna device 465 and the communication module 210.

The first antenna device 450 and the second antenna device 465 may transmit mmWave.

Each embodiment herein may be used in combination with any other embodiment(s) herein.

According to various example embodiments, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various example embodiments, a method according to an example embodiment may be included and provided in a computer program product. The computer program product may be traded as a product between a seller and a buyer (or purchaser described herein). The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a communication module comprising communication circuitry including a first configuration pin;
   a processor configured to identify a device type of the communication module through the first configuration pin; and
   a first antenna device, including at least one antenna, configured to be controlled by the communication module through at least the first configuration pin,
   wherein the communication module is configured to:
      transmit an identification signal for identifying the device type of the communication module through the first configuration pin for a time interval from a start of booting the processor to a completion of initializing the communication module, and
      transmit a first control signal for controlling the first antenna device through the first configuration pin after the time interval.

2. The electronic device of claim 1, further comprising:
   a switch configured to control a connection among the processor, the first antenna device, and the first configuration pin.

3. The electronic device of claim 2, wherein the switch is configured to be controlled to connect the processor and the first configuration pin for the time interval and connect the first antenna device and the first configuration pin after the time interval.

4. The electronic device of claim 3, wherein the switch is configured to be controlled by the processor.

5. The electronic device of claim 1, further comprising:
   a mainboard on which the communication module, the processor, and the first antenna device are provided,
   wherein the processor, the first configuration pin, and the first antenna device are connected through at least a wiring of the mainboard.

6. The electronic device of claim 1, wherein the processor is configured to:
   ignore a signal input from the first configuration pin after the time interval.

7. The electronic device of claim 1, wherein the first control signal is a control signal for activating the first antenna device, and
   the communication module further comprises:
      a second configuration pin, wherein the communication module is configured to transmit a second control signal for controlling a power management circuit (PMC) of the first antenna device through the second configuration pin.

8. The electronic device of claim 7, wherein the communication module is configured to:

transmit an identification signal for identifying the device type of the communication module through the second configuration pin for the time interval, and transmit the second control signal through the second configuration pin after the time interval.

9. The electronic device of claim 7, further comprising:

a second antenna device including at least one antenna, wherein the communication module further comprises:

a third configuration pin and a fourth configuration pin, wherein the communication module is configured to transmit a third control signal for activating the second antenna device through the third configuration pin, and transmit a fourth control signal for controlling a PMC of the second antenna device through the fourth configuration pin.

10. The electronic device of claim 9, wherein the communication module is configured to:

transmit an identification signal for identifying the device type of the communication module through the third configuration pin for the time interval, and transmit the third control signal through the third configuration pin after the time interval.

11. The electronic device of claim 9, wherein the communication module is configured to:

transmit an identification signal for identifying the device type of the communication module through the fourth configuration pin for the time interval, and transmit the fourth control signal through the fourth configuration pin after the time interval.

12. The electronic device of claim 8, wherein the communication module further comprises:

a first coaxial cable connector configured for connecting a coaxial cable for transmitting a vertical intermediate frequency signal between the first antenna device and the communication module, and a second coaxial cable connector configured for connecting another coaxial cable for transmitting a horizontal intermediate frequency signal between the first antenna device and the communication module.

13. The electronic device of claim 9, wherein the communication module further comprises:

a third coaxial cable connector configured for connecting a coaxial cable for transmitting a vertical intermediate frequency signal between the second antenna device and the communication module, and a fourth coaxial cable connector configured for connecting another coaxial cable for transmitting a horizontal intermediate frequency signal between the second antenna device and the communication module.

14. The electronic device of claim 10, wherein the first antenna device and the second antenna device are configured to transmit millimeter waves (mmWave).

15. A method of controlling an antenna device of an electronic device using at least a first configuration pin of a communication module, the method comprising:

transmitting an identification signal for identifying a device type of the communication module to a processor of the electronic device through the first configuration pin of the communication module for a time interval from a start of booting the processor to a completion of initializing the communication module; and transmitting a first control signal for controlling a first antenna device comprising at least one antenna, to the first antenna device, through the first configuration pin after the time interval.

16. The method of claim 15, further comprising:

controlling a switch of the electronic device so that the processor and the communication module are connected for the time interval; and controlling the switch so that the communication module and the first antenna device are connected after the time interval.

17. The method of claim 15, further comprising:

transmitting an identification signal for identifying the device type of the communication module to the processor through a second configuration pin of the communication module for the time interval; and transmitting a second control signal for controlling a power management circuit (PMC) of the first antenna device to the first antenna device through the second configuration pin after the time interval, wherein the first control signal is a control signal for activating the first antenna device.

18. The method of claim 15, further comprising:

transmitting an identification signal for identifying the device type of the communication module to the processor through a third configuration pin of the communication module for the time interval; and transmitting a third control signal for activating a second antenna device of the electronic device to the second antenna device through the third configuration pin after the time interval.

19. The method of claim 18, further comprising:

transmitting an identification signal for identifying the device type of the communication module to the processor through a fourth configuration pin of the communication module for the time interval; and transmitting a fourth control signal for controlling a PMC of the second antenna device to the second antenna device through the fourth configuration pin after the time interval.

20. A non-transitory computer-readable storage medium storing instructions that, when executed by a processor, cause the processor to perform the method of claim 15.

* * * * *